May 5, 1925. 1,536,857
A. M. HUDSON
MOLD FOR MAKING RUBBER MASKS OR FACE PIECES FOR RESPIRATORS,
INHALERS, AND SIMILAR ARTICLES
Original Filed Aug. 22, 1919  3 Sheets-Sheet 1
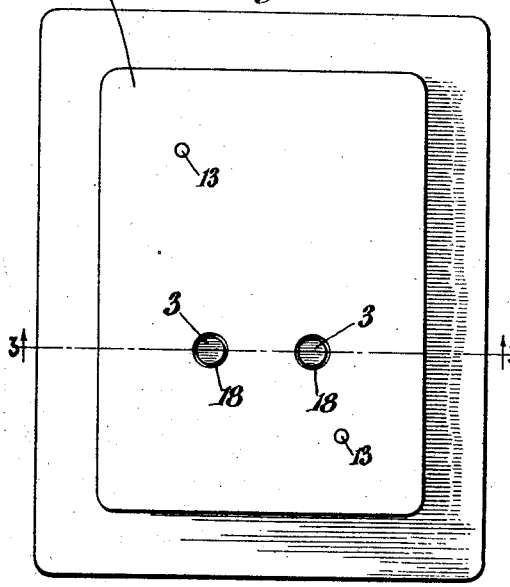
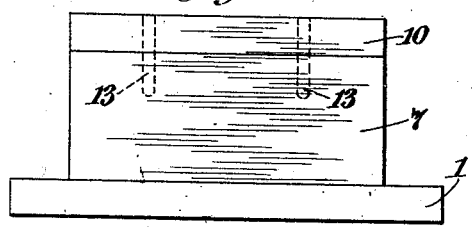
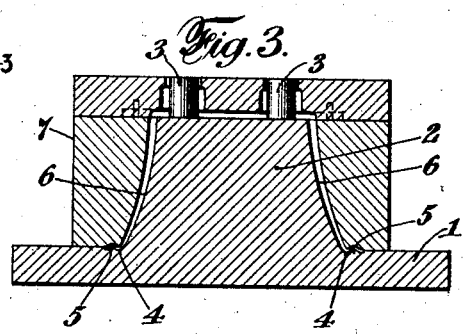
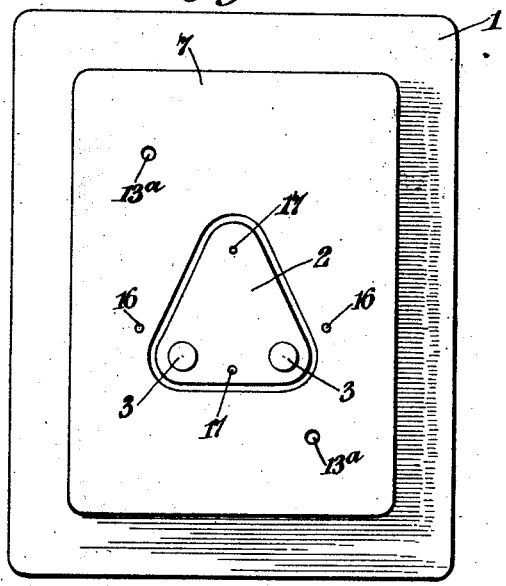
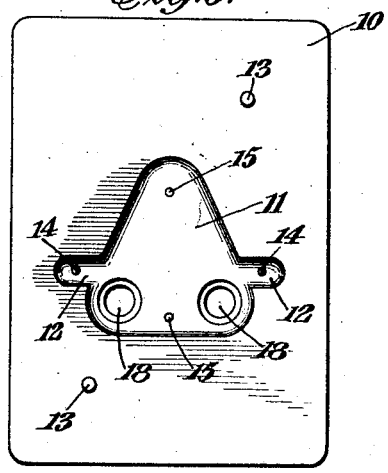
Inventor
Alexander M. Hudson
By his Attorneys
Kenyon & Kenyon May 5, 1925.  1,536,857
A. M. HUDSON
MOLD FOR MAKING RUBBER MASKS OR FACE PIECES FOR RESPIRATORS,
INHALERS, AND SIMILAR ARTICLES
Original Filed Aug. 22, 1919   3 Sheets-Sheet 2
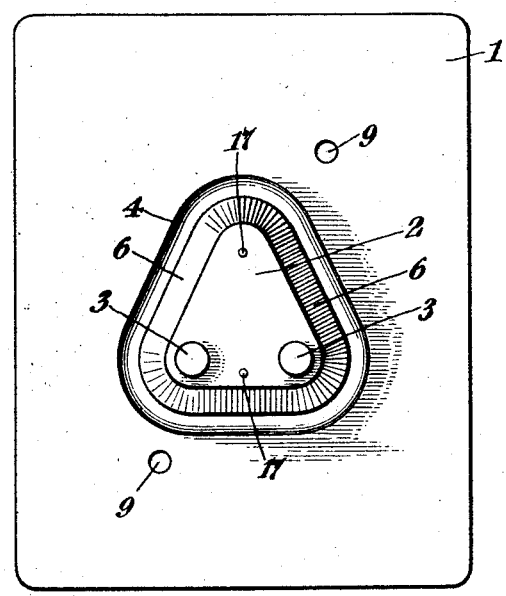
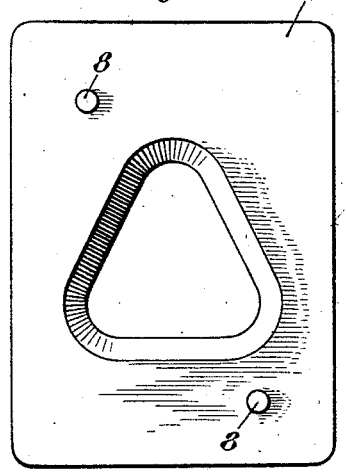
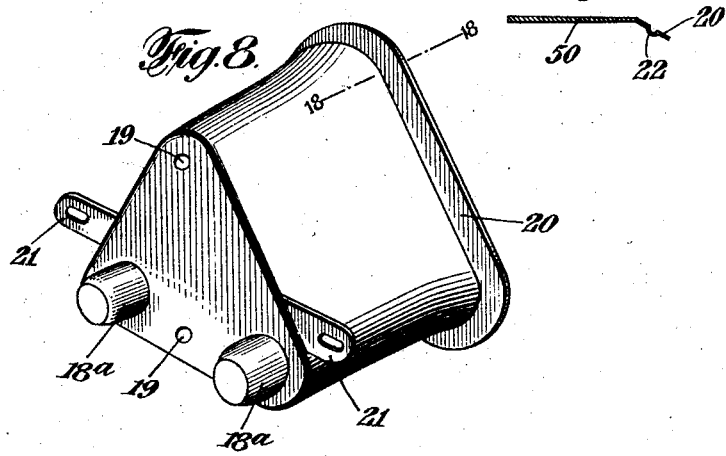
Inventor
Alexander M. Hudson
By his Attorneys
Kenyon & Kenyon May 5, 1925. 1,536,857
A. M. HUDSON
MOLD FOR MAKING RUBBER MASKS OR FACE PIECES FOR RESPIRATORS,
INHALERS, AND SIMILAR ARTICLES
Original Filed Aug. 22, 1919 3 Sheets-Sheet 3
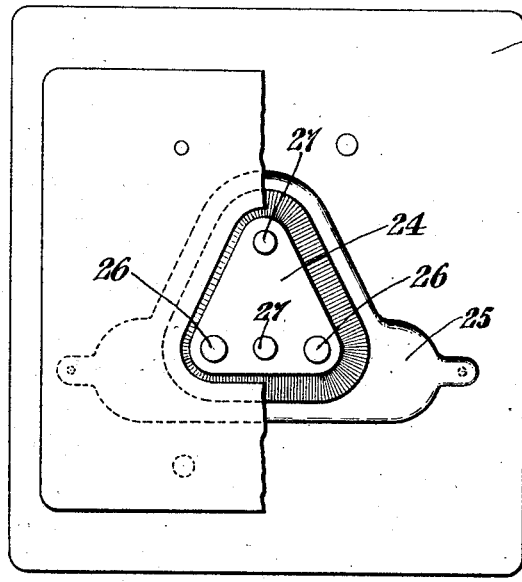
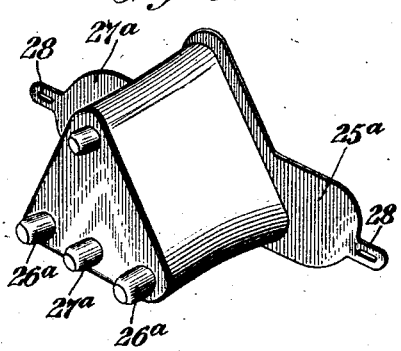
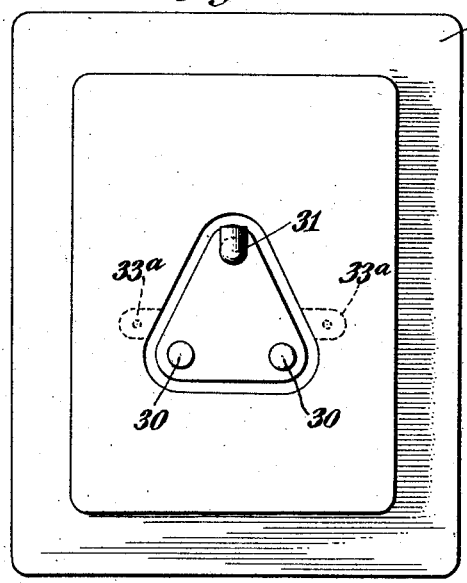
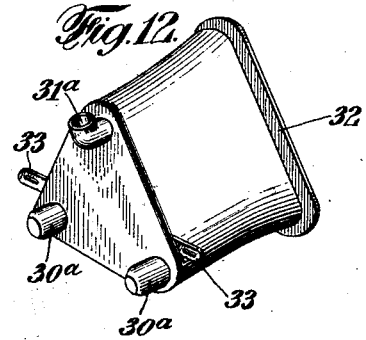
Inventor
Alexander M. Hudson
By his Attorneys
Kenyon & Kenyon Patented May 5, 1925.

1,536,857

UNITED STATES PATENT OFFICE.

ALEXANDER M. HUDSON, OF NEW YORK, N. Y., ASSIGNOR TO MELVIN A. RICE, OF NEW YORK, N. Y.

MOLD FOR MAKING RUBBER MASKS OR FACE PIECES FOR RESPIRATORS, INHALERS, AND SIMILAR ARTICLES.

Original application filed August 22, 1919, Serial No. 319,096. Divided and this application filed May 31, 1922. Serial No. 564,711.

*To all whom it may concern:*

Be it known that I, ALEXANDER M. HUDSON, a citizen of the United States, and a resident of New York, in the county and State of New York, have invented certain new and useful Improvements in Molds for Making Rubber Masks or Face Pieces for Respirators, Inhalers, and Similar Articles, of which the following is a specification.

My invention relates to rubber masks and to face piece for respirators, inhalers and the like, and to means for making the same, and is a division of my application Serial No. 319,096, filed Aug. 22, 1919.

It has for its object to produce face pieces for respirators, inhalers, fire masks, and similar articles, of rubber, including preferably the means for attaching not only the containers which hold the chemical filtering material or neutralizer through which inhalation takes place, but also the exhalation devices, as well as means for fastening the device to the head of the user, the entire contrivance being preferably in one piece.

Its object also is to meet the growing need for a respirator that can be had at a low cost for those workers in industries whose health is endangered by coming into necessary contact with bacteria, poisonous fumes, noxious gases and disease germs, as well as for protection against dust, smoke and other deleterious agents.

Another object is to form the walls of the mask or face piece so that the inner walls which contact with the face of the user shall be thinner than the rest of the mask or face piece; preferably by graduating or diminishing the thickness of such walls toward the inner edges of the mask. This construction results in a practically perfect air seal.

Another object is to produce a mask with a thin rim or flange extending around the inner or face-contacting portion and in which, if desired, a groove is formed, to make thorough the air-excluding contact with the face.

Another object of my invention is to provide a mask for use in sudden emergencies which, owing to its novel construction, can be instantly applied to the face and retained there for some time without fastenings by mere inhalation of the user, the exhausting of the air in the mask in this way creating a practical vacuum.

Another object is to provide a mold with interchangeable members so that the face piece may be formed alone or may, in one operation, be integrally combined with the other features hereinafter described.

Other objects are to make it possible to construct at moderate cost respirators and similar articles of light weight which are adapted to be made readily applicable to all types of faces, are easily attached and fit better than any heretofore known, and which do not irritate the face; whose operation is certain and which can be kept on indefinitely; which can be used repeatedly and yet always be kept clean and sanitary since, being made of rubber, they can be subjected to frequent sterilization without deteriorating; and which, in emergencies, can be applied to the face instantly and retained there without fastenings for a considerable time.

In the drawings accompanying this specification I have illustrated several forms of my new mask, and my preferred form of mold for making the same. Fig. 1 is a plan view of the assembled parts of the mold; Fig. 2 is an end view thereof; Fig. 3 is a cross-section on the line 3—3 of Fig. 1; Fig. 4 is a plan view of the base plate with its upwardly extending triangular center part or core, and of the second or cavity plate, the third or top plate not being shown; Fig. 5 is an inside view of the top plate; Fig. 6 is a plan view of the core; Fig. 7 is a bottom view of the cavity plate; Fig. 8 is a perspective view of a finished mask or protector for the nostrils only, made by the mold illustrated in the preceding figures, Fig. 13 being a cross section on the line 18—18 showing the thin inner wall thereof with its flange and concave portion. Fig. 9 is a partial plan view of a modified form of mold, part of the top plate being broken away, and Fig. 10 is a perspective view of the type of mask made by this mold. Fig. 11 is a plan view of another modification of my mold, the top plate being removed, and Fig. 12 a perspective view of the type of mask produced thereby.

Referring particularly to Figs. 1 to 8 inclusive, which illustrate the preferred embodiment of my invention, 1 represents the base plate, and 2 the triangular centre or core portion forming part thereof, shown in plan in Fig. 6. 3, 3 are circular members extending upwardly from said core. The bottom or base plate is cut away at 4 near the base of the core, and in this design of mold is provided with a rib 5. The triangular core is made with walls which slope slightly upward and inward from the bottom plate, as shown at 6. 7 is the centre or cavity plate which fits over the triangular core portion 2. An inside view of this cavity plate is illustrated in Fig. 7, its walls sloping to conform with those of the triangular core, and having dowel pins 8 which engage with holes 9 located in the bottom plate 1. 10 is the top plate countersunk as at 11 to correspond with the triangular core portion, and at 12, 12 to form extensions for fastening means, 13, 13 being dowel pins fitting in holes 13ª, 13ª. 14, 14 and 15, 15 are openings for the reception of the pins 16, 16 and 17, 17, respectively. 18, 18 are holes which engage the members 3, 3.

In carrying out my invention on my improved mold described above, I proceed as follows: The sections of the mold being separated, strips of rubber are placed around and on top of the triangular portion of the bottom plate, and are made to overlap the part of the cutout portion 4 at the base. The centre or cavity plate is then placed in position over the core, and pieces of rubber placed around the two circular members on top of the core, and on portions of the top of the centre plate to form extensions for fastening means. When this has been done the top of the device is put on, and the mold placed in a press which is operated until the two platens of the press between which it is located have brought the heavy metal parts of the mold into close contact.

The mold is retained in the press, which is heated in any desired way at a pressure of from ninety to one hundred pounds, until the heat and pressure both unite and vulcanize the rubber into the desired shape. The time required usually varies from between ten minutes to three quarters of an hour or thereabouts. The resulting product is a device which is in one piece, having graduating walls that reach their greatest degree of thinness at their inner or face-contacting parts, a flange encircling the said inner part, and with hollow projections to which containers holding chemical neutralizers may be coupled as well as means for fastening and attaching thereto exhalation devices.

In the finished device shown in Fig. 8, 18ª, 18ª are the tubular members to which the containers holding the chemical composition or neutralizer are joined, and through which the user inhales the air, and 19, 19 are holes to which the exhalation valves are attached. 20 is the flange and 21, 21 are the extension pieces for any appropriate fastening means.

In putting the rubber in the mold it is not necessary to have it in one strip. Any number of pieces, small and large, may be used, the only essential being that sufficient is put in to cover the sides and top of the core and surround the pins and overlap for the extensions.

A very important feature of my invention is the provision for securing the thin inner walls referred to above, shown at 50 in Fig. 13.

In the form shown in Figure 13 a concave portion 22, illustrated in Fig. 13, is provided in flange 20, which operates to render more effective the air seal resulting from the close contact with the face. As is evident, this is due to the added flexibility given to the flange by the resiliency of this "loop," so that when pressure is applied to it, either by inhalation or through fastening means, it flattens out on the face to some extent, and makes the entry of noxious air or poisonous fumes impossible. But even where the flange is entirely dispensed with, and the walls of the mask are straight, their thinness is of such a degree that in use their mere contact with the face is sufficient to cause them to flatten out at their edges and form a narrow flange, thus retaining the vacuum created.

Fig. 9 shows a modification of my improved mold, the construction of which will be clear from the above description. 23 is the base plate, and differs from the base plate already described merely in having, in addition to the triangular core 24, the depressed portion 25. 26, 26 and 27, 27 are members for the formation of the inhalation and exhalation means, respectively, the purposes for which have already been referred to in connection with other figures. Fig. 10 illustrates a finished mask made on this mold. 25ª is a combined flange and fastening flap to hold the respirator in place, either by means of a button placed in one of the holes 28, or in any way desired. 26ª, 26ª and 27ª, 27ª are the tubular members to which the inhalation and exhalation devices, respectively, are connected.

In Figs. 11 and 12 are shown another modification of the improved mold and its product. The base plate 29 is similar to those already described except that its triangular core has formed on it, in addition to the two upright members 30, 30, the curved member 31. The reason for this is seen in Fig. 12 in the tubular curved member 31ª opening at right angles to the straight tubular members 30ª, 30ª. 32 is the flange and 33, 33 the fastening device. The method of producing these has already been described, and the means for forming the latter are shown in dotted lines at 33ª, Fig. 11.

The mask illustrated in Fig. 12 is particularly adapted for dental work. It is in use placed over the nostrils and retained there while the work is progressing. The source of supply of the gas, or other anesthetic to be administered, is connected with 31ª. The exhalation devices are attached to 30ª 30ª. After the requisite condition of analgesia has been produced in the patient, the supply is cut off but, as the patient is always under the observation of the physician, the supply can be renewed as needed. The device is therefore never in the way of the physician at work, and provides means for the respiration of the patient and ready control of the anesthetic.

One of the very great advantages of my face piece or mask in all its forms is the ease with which it can be fitted to all types of faces. The thin side walls readily adapt themselves to the average face, and even when not made with a set flange, these walls with the slightest pressure form the flange I have described; but where a peculiarly shaped nose, or some other unusual facial characteristic is present, a small V-shaped section cut out of the part fitting over the nose, will usually suffice to create a tight fit.

My invention is also peculiarly well suited to masks for use in great emergencies such, for instance, as in the case of explosions or the breaking of a retort in a laboratory, where protection against poisonous fumes or gases for a short time is vital. Such a mask, constructed in accordance with my invention, with its thin side walls, but without inhalation or exhalation vents, can be clapped to the face instantly, and the simple inhalation of the user, thereby creating a vacuum, will be sufficient to retain it in place for several minutes without any fastening.

My improved mask or face piece illustrated in the drawings and described above, is not claimed herein but is covered in pending application Serial No. 319,096, of which this is a division.

It will be understood, of course, that changes within the scope of the appended claims may be made in my improved mold without departing from the spirit of my invention.

What I claim as new and desire to secure by Letters Patent is:

1. A mold for making masks or face-pieces for respirators, inhalers and similar articles, consisting of a base plate, a core extending upward therefrom, a cavity plate fitting loosely over said core, said core and cavity plate having sloping walls which are adapted to leave a graduated opening therebetween, a top plate upon said cavity plate, and means to hold all of said members in combined engagement for the purpose herein set forth.

2. A mold for making masks or face pieces for respirators, inhalers and similar articles consisting of a member with a substantially triangular core having upright members formed integral therewith, the walls of said core sloping upward and inward from the base, a second member with a cavity therein fitting loosely over said core, the walls of said cavity inclined at such an angle with the sloping walls of the core as to leave a space narrower at the base than elsewhere, a third member to engage the other members, and means for holding the members together in combined engagement for the purpose herein set forth.

3. A mold for making masks or face pieces for respirators, inhalers and similar articles consisting of a base plate with a substantially triangular core formed integral therewith, said core having upwardly extending members, a second plate with a cavity therein adapted to fit over said core, the walls of said core and said cavity plate so shaped as to have the narrowest space at the bottom, and a top plate to engage said cavity plate and the top of the core, and means for holding the members together in combined engagement for the purpose herein set forth.

4. In molds for making masks or face pieces for respirators, inhalers, and similar articles, the combination of a base plate with a core formed integral therewith, a second plate with a cavity therein adapted to fit over said core, the walls of said core and said cavity plate so shaped as to have the narrowest space at the bottom, and means for enclosing said core and cavity plate to form a mold, and holding the members in combined engagement for the purpose herein described.

5. In molds of the character herein described, the combination of a base plate with a core formed integral therewith, a plate with a cavity therein adapted to fit over said core, the walls of said core and said cavity plate so shaped as to have the narrowest space at the bottom, the lower surface of the cavity plate being cut away to form a narrow groove, and means for enclosing said core and cavity plate to form a mold and to hold the members in combined engagement for the purpose herein set forth.

6. A mold for making masks or face pieces for respirators, inhalers and similar articles, consisting of a base plate with a core formed integral therewith, a plate with a cavity therein adapted to fit over said core, the walls of the core and said cavity plate so shaped as to have the narrowest space between them at the bottom, a ridge around the base plate adjacent the core, and the under side of the cavity plate cut away to form a space above said ridge whereby a groove is formed in the mask, and means for enclosing said core and cavity plate to form a mold and hold the members in combined engagement for the purpose herein described.

7. In molds of the character herein described, the combination of a base plate with a core formed integral therewith, a cavity plate fitting loosely over said core, the walls of said core and said cavity plate so shaped as to have the narrowest space between them at the bottom, members extending upright from said core, and a top plate with recesses corresponding to said upright members to close the mold, substantially as set forth.

8. The mold for making masks or face pieces of rubber having, in combination a base plate having a raised core portion with sloping sides, a cavity plate with inclined sides fitting loosely over said core, between which base and cavity plates rubber is placed to form the walls of the face piece, the space between said members decreasing in width to form walls of graduated thinness, a top plate with its under side countersunk to accommodate the top of said core, between which core and top plate rubber is placed to form the back of the face piece, and means for holding all the members of the mold together in combined engagement for the purpose set forth.

9. The mold for making masks or face pieces of rubber having, in combination, a base or bottom plate having a raised core portion with sloping sides, a cavity plate with inclined sides fitting loosely over said core between which base and cavity plates rubber is placed to form the walls of the face piece, the space between said members decreasing in width to form walls of graduated thinness, members extending from said core piece, a top plate with its under side countersunk to accommodate the top of said core with its extending members, between which core and top plates rubber is placed to form the back of the face piece with its openings for inhalation and exhalation devices, and means for holding all the members of the mold together in combined engagement for the purpose set forth.

10. The mold for making masks or face pieces of rubber having, in combination, a base or bottom plate having a raised core portion with sloping sides and a cutaway portion surrounding the base of said core, a cavity plate with inclined sides fitting loosely over said core, between which base and cavity plates and over said cutaway portion rubber is placed to form the walls of the face piece and a flange, the space between said members decreasing in width to form walls of graduated thinness, members extending from said core piece, a top plate with its under side countersunk to accommodate the top of said core with its extending members, between which core and top plate rubber is placed to form the back of the face piece with its openings for inhalation and exhalation devices, and means for holding all of the members of the mold in combined engagement for the purpose set forth.

11. The mold for making masks or face pieces of rubber having, in combination, a base or bottom plate having a raised core portion with sloping sides and a cutaway portion surrounding the base of said core, a cavity plate with inclined sides fitting loosely over said core, between which base and cavity plates and over said cutaway portion rubber is placed to form the walls of the face piece and a flange, the space between said members decreasing in width to form walls of graduated thinness, members extending from said core piece, a top plate with its underside countersunk to accommodate the top of said core with its extending members, and having a depressed section extending from either side of the said sunken part, between which core and top plate rubber is placed to form the back of the face piece with its openings for inhalation and exhalation devices, and extension pieces for fastening purposes, and means for holding all of the members of the mold in combined engagement for the purpose set forth.

12. The mold for making masks or face pieces of rubber having, in combination, a bottom plate having a raised core portion with sloping sides and a cutaway portion surrounding the base of said core, and a rib in said cutaway portion, a cavity plate with inclined sides fitting loosely over said core, between which base and cavity plates and over said cutaway portion rubber is placed to form the walls of the face piece and a flange with a groove therein, the space between said members decreasing in width to form walls of graduated thinness, members extending from said core piece, a top plate with its under side countersunk to accommodate the top of said core with its extending members, between which core and top plate rubber is placed to form the back of the face piece with its openings for inhalation and exhalation devices, and means for holding the members of the mold in combined engagement for the purpose set forth.

13. The mold for making masks or face pieces of rubber having in combination, a bottom plate with a depressed area and a raised core portion with sloping sides extending upward therefrom, a cavity plate with inclined sides fitting loosely over said core, between which base and cavity plates rubber is placed to form the walls of the face-piece and a flange, the space between said members, decreasing in width to form walls of graduated thinness, members extending from said core piece, a top plate with its under side countersunk to accommodate the top of said core with its extending members, between which core and top plate rubber is placed to form the back of the face piece with its openings for inhalation and exhalation devices, and means for holding the members of the mold in combined engagement for the purpose set forth.

14. The mold for making masks or face pieces of rubber having, in combination, a bottom plate with a depressed area and a raised core portion with sloping sides extending upward therefrom, a cavity plate with inclined sides fitting loosely over said core, between which base and cavity plates rubber is placed to form the walls of the face piece and a flange, members extending from said core piece, a top plate with its under side countersunk to accommodate the top of said core with its extending members, between which core and top plate rubber is placed to form the back of the face piece with its openings for inhalation and exhalation devices, and means for holding the members of the mold in combined engagement for the purpose set forth.

In testimony whereof I have signed my name to this specification.

ALEXANDER M. HUDSON.